(12) United States Patent
Xiong et al.

(10) Patent No.: US 12,578,480 B2
(45) Date of Patent: Mar. 17, 2026

(54) TRUSTED SPACE POSITIONING CALIBRATION SERVICE SYSTEM AND OPERATION METHOD THEREOF

(71) Applicant: National Institute of Metrology, China, Beijing (CN)

(72) Inventors: Xingchuang Xiong, Beijing (CN); Xiang Fang, Beijing (CN); Yanlin Liang, Beijing (CN); Zhengyi Zhao, Beijing (CN); Zhen Liu, Beijing (CN); Wenkui He, Beijing (CN)

(73) Assignee: National Institute of Metrology, China, Beijing (CN)

( * ) Notice: Subject to any disclaimer, the term of this patent is extended or adjusted under 35 U.S.C. 154(b) by 323 days.

(21) Appl. No.: 18/408,070

(22) Filed: Jan. 9, 2024

(65) Prior Publication Data

US 2024/0142634 A1      May 2, 2024

Related U.S. Application Data

(63) Continuation of application No. PCT/CN2022/133948, filed on Nov. 24, 2022.

(30) Foreign Application Priority Data

Nov. 18, 2022    (CN) .......................... 202211446847.3

(51) Int. Cl.
*G01S 19/23*          (2010.01)
*G01S 19/43*          (2010.01)

(52) U.S. Cl.
CPC ............. *G01S 19/235* (2013.01); *G01S 19/43* (2013.01)

(58) Field of Classification Search
CPC .......... G01S 19/07; G01S 19/23; G01S 19/41; G01S 19/43
See application file for complete search history.

(56) References Cited

U.S. PATENT DOCUMENTS

| | | | | |
|---|---|---|---|---|
| 2015/0308841 A1* | 10/2015 | Matsunaga | ............ | G01C 21/30 |
| | | | | 701/428 |
| 2017/0131406 A1* | 5/2017 | Li | ........................... | G01S 19/11 |
| 2020/0068348 A1* | 2/2020 | Li | ......................... | G01S 19/071 |

FOREIGN PATENT DOCUMENTS

| | | |
|---|---|---|
| CN | 101504454 A | 8/2009 |
| CN | 104796980 A | 7/2015 |

(Continued)

OTHER PUBLICATIONS

X. Chen et al., Implementation and validation of a Localisation Assurance service provider, 2012 6th ESA Workshop on Satellite Navigation Technologies (Navitec 2012) & European Workshop on GNSS Signals and Signal Processing, p. 1-8 (Year: 2012).*

(Continued)

*Primary Examiner* — Robert W Hodge
*Assistant Examiner* — Fred H Mull
(74) *Attorney, Agent, or Firm* — Quarles & Brady LLP

(57)          ABSTRACT

The present application provides a trusted space positioning calibration service system and an operation method thereof. The system includes: a differential benchmark data service module, a positioning data digital calibration server and a trusted space positioning calibration apparatus. The differential benchmark data service module is configured to provide differential benchmark data to the trusted space positioning calibration apparatus; the trusted space positioning calibration apparatus is configured to collect original positioning data of the trusted space positioning calibration apparatus and perform differential positioning solution in combination with the differential benchmark data, and obtain positioning data after the differential positioning solution as positioning data to be calibrated; the positioning data digital calibration server is configured to receive original positioning data, the differential benchmark data and the positioning data to be calibrated from the trusted space (Continued)

positioning calibration apparatus and calibrate the positioning data to be calibrated according to the these data.

10 Claims, 3 Drawing Sheets

(56) References Cited

FOREIGN PATENT DOCUMENTS

| CN | 106324645 | A | | 1/2017 | | |
|----|-----------|---|---|--------|---|---|
| CN | 111352998 | A | | 6/2020 | | |
| CN | 111768528 | A | | 10/2020 | | |
| CN | 112788536 | A | * | 5/2021 | ............ | G01S 19/21 |
| CN | 114915362 | A | * | 8/2022 | ........... | G06K 15/102 |
| KR | 20190000439 | A | * | 1/2019 | ............ | A01M 29/00 |

OTHER PUBLICATIONS

L.C. Ribeiro et al., Implementation of Cybersecurity Procedures in Remote Calibration for PNT Services, 2018 Workshop on Metrology for Industry 4.0 and loT, p. 209-212 (Year: 2018).*

T. Mustapää et al., Digital Metrology for the Internet of Things, 2020 Global Internet of Things Summit (GIoTS), 6 pages (Year: 2020).*

International Search Report and Written Opinion, International Application No. PCT/CN2022/133948, Jun. 21, 2023.

Peng Xiaogang et al. Research on Data Processing Method of Ship System Test Based on Mobile Reference Station Surveying and Mapping Engineering, vol. 26, No. 04, Apr. 25, 2017 (Apr. 25, 2017).

Notice of Allowance for Chinese Patent Application No. 2022114468473; dated Apr. 17, 2025; 6 pages.

* cited by examiner

```
┌─────────────────────┐          ┌─────────────────────┐
│ Differential benchmark│   ⇨      │ Positioning data digital│
│  data service module │          │  calibration server  │
│         101          │          │         102          │
└─────────────────────┘          └─────────────────────┘
          ⇕                                  ⇕
        ╭──────────────────────────────────────────╮
        │            Internet                        │
        │             401                            │
        ╰──────────────────────────────────────────╯
          ⇕                                  ⇕
┌───────────────────────────────────────────────────────────────────┐
│  ┌─────────────────────┐    ┌─────────────────────┐   ┌─────────────────────┐
│  │  Positioning data   │ ⇒  │ Positioning data digital│  │      Device       │
│  │ calculation service │ ⇐  │  calibration client  │ ⇐ │  certificate (CA)  │
│  │     module 202      │    │         203          │   │        205         │
│  └─────────────────────┘    └─────────────────────┘   └─────────────────────┘
│          ⇑                            ⇓
│  ┌─────────────────────┐    ┌─────────────────────┐
│  │ GNSS positioning module│  │  Positioning data   │
│  │         201         │    │   DCC certificate   │
│  └─────────────────────┘    │        204          │
│                             └─────────────────────┘
│                                       ⇓
│                             ┌─────────────────────┐
│                             │ Trusted space positioning│
│                             │  calibration data    │ ⇐
│                             │  service module      │
│                             │        206          │
│                             └─────────────────────┘
│  Trusted space positioning calibration apparatus
└───────────────────────────────────────────────────────────────────┘
                                       ⇕
        ╭──────────────────────────────────────────╮
        │ Trusted space positioning calibration      │
        │  data service interface 402                 │
        ╰──────────────────────────────────────────╯
                                       ⇕
                             ┌─────────────────────┐
                             │ Data application APP │
                             │         301          │
                             └─────────────────────┘
```

FIG. 1

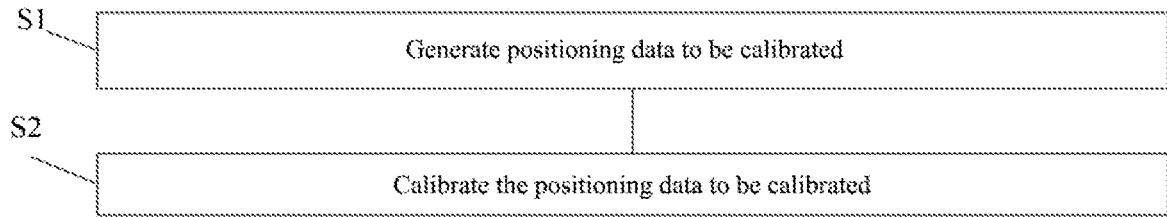

S1    Generate positioning data to be calibrated

S2    Calibrate the positioning data to be calibrated

FIG. 2

TRUSTED SPACE POSITIONING CALIBRATION SERVICE SYSTEM AND OPERATION METHOD THEREOF

CROSS-REFERENCE TO RELATED APPLICATIONS

This application is a continuation of International Application No. PCT/CN2022/133948, filed on Nov. 24, 2022, which claims priority to Chinese Patent Application No. 202211446847.3, filed on Nov. 18, 2022. The disclosures of the aforementioned applications are hereby incorporated by reference in their entireties.

TECHNICAL FIELD

The present application relates to the field of spatial positioning calibration technology, and in particular, to a trusted space positioning calibration service system and an operating method thereof.

BACKGROUND

With the development of digital economy, digital products and services are increasingly entering people's lives. Accurate and trusted spatial positioning calibration and its related data service requirements are also increasing day by day, and it has been widely used in agricultural products origin tracing, geographic information identification authentication, spatial stamp data service and other industries.

At present, the spatial positioning service module and apparatus used for spatial positioning calibration have the following defects.

Firstly, the original positioning data is generated only by GNSS (Global Navigation Satellite System) module, which is affected by multiple factors such as orbit error, satellite clock error, ionospheric error, tropospheric error, multipath error, receiver clock error and receiver noise, and the accuracy and stability of positioning data are low. In addition, in order to improve the accuracy of positioning data, RTK (carrier phase difference technology) is used for difference solution to obtain higher accuracy solution. However, the differential solution method mostly refers to commercial data (differential benchmark data provided by service providers). Due to the satellite occlusion and radio interference on the benchmark station, it will directly affect the measurement of all mobile stations, and the commercial data is not trusted.

Secondly, the time-frequency deviation problem often occurs during the actual operation of the satellite navigation receiver. In addition, if the data of the positioning device drifts, the measurement characteristics of the instruments and devices will slowly change "drift" with the passage of time after drift calibration, resulting in the inaccuracy of the obtained positioning data. However, most commonly used positioning apparatuses do not calibrate positioning data regularly, nor do they have the function of correcting data through calibration parameters. The carrier of calibration data is not verifiable and traceable.

Thirdly, the reliability of the positioning data obtained by the positioning module and apparatus is low. The positioning data generated by the positioning module and apparatus is neither verifiable nor having traceable digital identity attribute.

Therefore, the technical problem that needs to be solved urgently at present is: how to improve the accuracy and credibility of obtaining positioning data.

SUMMARY

The purpose of the present application is to provide a trusted space positioning calibration service system and an operation method thereof, to acquire a reliable and verifiable spatial positioning calibration digital calibration certificate, to improve the accuracy and reliability of obtaining positioning data by allowing the calibration parameter in the digital calibration certificate to participate in the positioning data solution of the RTK-based spatial positioning calibration apparatus.

In order to achieve the above purpose, the present application provides a trusted space positioning calibration service system. The system includes: a differential benchmark data service module, a positioning data digital calibration server and a trusted space positioning calibration apparatus; the differential benchmark data service module is communicatively connected to the trusted space positioning calibration apparatus, and is configured to provide differential benchmark data to the trusted space positioning calibration apparatus; the trusted space positioning calibration apparatus is configured to collect original positioning data of the trusted space positioning calibration apparatus, perform differential positioning solution in combination with the differential benchmark data, and obtain positioning data after the differential positioning solution as positioning data to be calibrated; the positioning data digital calibration server is communicatively connected to the trusted space positioning calibration apparatus, and is configured to receive original positioning data, the differential benchmark data and the positioning data to be calibrated from the trusted space positioning calibration apparatus and calibrate the positioning data to be calibrated according to the original positioning data, the differential benchmark data and the positioning data to be calibrated to obtain calibration result data.

The trusted space positioning calibration service system as described above, where the trusted space positioning calibration apparatus includes a positioning data DCC certificate, the positioning data DCC certificate is generated by the positioning data digital calibration server after each calibration is completed, and is configured to participate in a differential positioning solution process of the original positioning data combined with the differential benchmark data when generating precise positioning data and provide a calibration correction parameter for the positioning data to obtain more accurate positioning data.

The trusted space positioning calibration service system as described above, where the trusted space positioning calibration apparatus includes a GNSS positioning module, configured to collect the original positioning information of the trusted space positioning calibration apparatus; a positioning data calculation service module, configured to perform differential positioning solution by combining the original positioning information with the differential benchmark data to obtain the positioning data after the differential positioning solution; a positioning data digital calibration client, configured to perform timing calibration on the positioning data after the differential positioning solution; and a trusted space positioning calibration data service module, configured to achieve data interaction with an external apparatus of the trusted space positioning calibration apparatus.

The trusted space positioning calibration service system as described above, where the trusted space positioning calibration apparatus further includes: a device certificate and a positioning data DCC certificate, the device certificate is used to identify and verify the trusted space positioning calibration apparatus; the positioning data DCC certificate is generated by the positioning data digital calibration server encapsulating business data and the calibration result data of the positioning data calibration of the trusted space positioning calibration apparatus.

The trusted space positioning calibration service system as described above, where the system further includes: a trusted space positioning calibration data service interface, configured to communicatively connect the trusted space positioning calibration apparatus with an external data application APP.

The present application also provides an operation method of a trusted space positioning calibration service system. The method includes the following steps: generating positioning data to be calibrated; and calibrating the positioning data to be calibrated.

The operation method of the trusted space positioning calibration service system as described above, where the generating positioning data to be calibrated includes: collecting original positioning data of a trusted space positioning calibration apparatus; obtaining differential benchmark data; and performing differential positioning solution in combination with the differential benchmark data according to the original positioning data, and obtaining positioning data after the differential positioning solution as positioning data to be calibrated.

The operation method of the trusted space positioning calibration service system as described above, where the calibrating the positioning data to be calibrated includes: calibrating positioning data to be calibrated according to original positioning data, differential benchmark data and the positioning data to be calibrated to obtain calibration result data; and generating positioning data DCC certificate including calibration correction parameter after each calibration is completed, where the positioning data DCC certificate is used to participate in a differential positioning solution process of the original positioning data combined with the differential benchmark data when generating precise positioning data and provide a calibration correction parameter for the positioning data to obtain more accurate positioning data.

The operation method of the trusted space positioning calibration service system as described above, where the calibrating the positioning data to be calibrated further includes: encapsulating business data and the calibration result data of the positioning data calibration of the trusted space positioning calibration apparatus to generate positioning data DCC certificate; and storing the positioning data DCC certificate in the trusted space positioning calibration apparatus.

The operation method of the trusted space positioning calibration service system as described above, where the operation method further includes: generating a device certificate and storing the device certificate in the trusted space positioning calibration apparatus.

The operation method of the trusted space positioning calibration service system as described above, where the operation method further includes: providing a data service for an external data application through multiple interface service modes.

The beneficial effects achieved by the present application are as follows.

(1) The present application performs calibration corrections on the calculation parameter to obtain higher-precision positioning data by making the calibration correction parameter in the positioning data DCC certificate to participate in the positioning data calculation process based on the RTK algorithm.

(2) The positioning data digital calibration calculation module of the present application performs calibration and comparison based on metering-grade GNSS differential benchmark data and summary data uploaded by the positioning data digital calibration client, calculates and generates a calibration result data DCC file, and returns the calibration result data DCC file to the positioning data digital calibration client for storing in the trusted space positioning calibration apparatus to provide the correction parameter for subsequent generation of positioning data, thereby obtaining higher-precision positioning data.

(3) The device certificate (CA) of the present application is bound to a hardware ID of the trusted space positioning calibration apparatus and serves as an implementation carrier for its digital identity verification during data calibration and when trusted positioning data is released. Through the digital signature and verification of the device certificate, data identity verification and traceability are achieved. By using a key of the device certificate to provide encryption and decryption functions for the positioning data and calibration data, the security and reliability requirements of system data are achieved.

BRIEF DESCRIPTION OF DRAWINGS

In order to more clearly explain the embodiments of the present application or the technical solution in the prior art, the drawings needed in the description of the embodiments or the prior art will be briefly introduced below. Obviously, the drawings in the following description are only some embodiments recorded in the present application, and other drawings can be obtained according to these drawings for those skilled in the art.

FIG. 1 is a schematic structural diagram of a trusted space positioning calibration service system according to an embodiment of the present application.

FIG. 2 is a flow chart of an operating method of a trusted space positioning calibration service system according to an embodiment of the present application.

Figure 3:
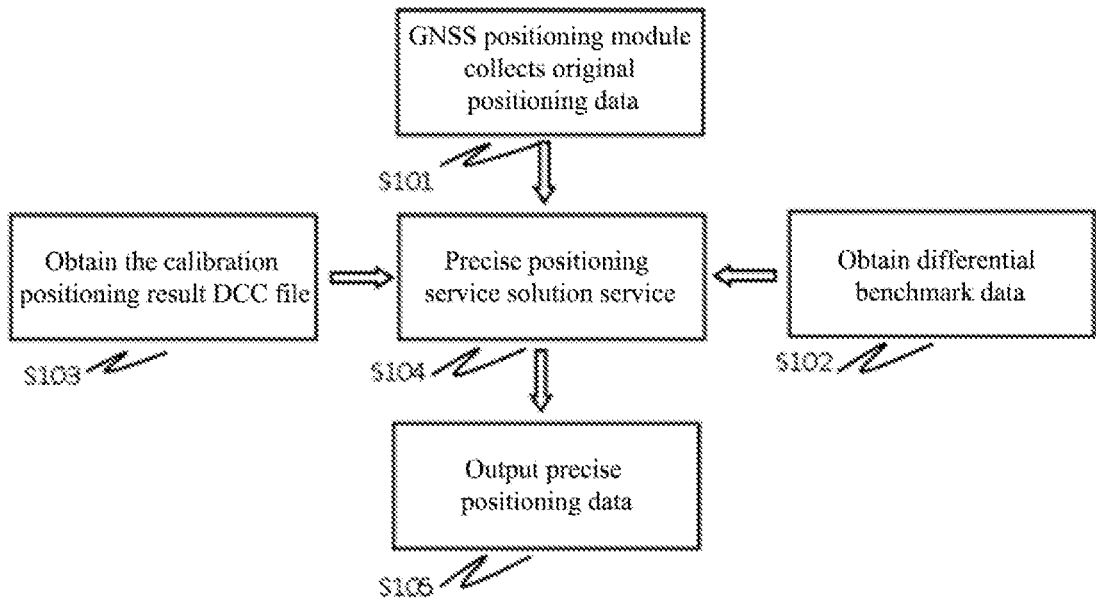
FIG. 3 is a flowchart of a method for generating more accurate positioning data using a calibration positioning result DCC file according to an embodiment of the present application.

Reference signs: 101—differential benchmark data service module; 102—positioning data digital calibration server; 201—GNSS positioning module; 202—positioning data solution service module; 203—positioning data digital calibration client; 204—positioning data DCC certificate; 205—device certificate (CA); 206—trusted space positioning calibration data service module; 301—data application APP; 401—internet; 402—trusted space positioning calibration data service interface.

DESCRIPTION OF EMBODIMENTS

The technical solutions in the embodiments of the present application are clearly and completely described below with reference to the accompanying drawings in the embodiments of the present application. Obviously, the described embodiments are part of the embodiments of the present application, rather than all of the embodiments. Based on the embodiments in the present application, all other embodiments obtained by those skilled in the art without creative efforts shall fall within the protection scope of the present application.

Embodiment 1

As shown in FIG. 1, the present application provides a trusted space positioning calibration service system for accurately calibrating spatial position information of the apparatus. The system includes: a differential benchmark data service module 101, a positioning data digital calibration server 102 and a trusted space positioning calibration apparatus. The differential benchmark data service module 101 is communicatively connected to the trusted space positioning calibration apparatus, and is configured to provide differential benchmark data to the trusted space positioning calibration apparatus, where the differential benchmark data is metering-grade GNSS differential benchmark data; the trusted space positioning calibration apparatus is configured to collect original positioning data of the trusted space positioning calibration apparatus, perform differential positioning solution in combination with the differential benchmark data, and obtain positioning data after the differential positioning solution as positioning data to be calibrated; the positioning data digital calibration server 102 is communicatively connected to the trusted space positioning calibration apparatus, and is configured to receive original positioning data, the differential benchmark data and the positioning data to be calibrated from the trusted space positioning calibration apparatus and calibrate the positioning data to be calibrated according to the original positioning data, the differential benchmark data and the positioning data to be calibrated to obtain calibration result data.

As a specific embodiment of the present application, the metering-grade GNSS differential benchmark data provided by the differential benchmark data service module 101 is centimeter-level and sub-meter-level differential benchmark data provided using RTK (carrier phase difference) technology, and data interaction is performed between the metering-grade GNSS differential benchmark data and the trusted space positioning calibration apparatus by using the NTRIP protocol through the Internet 401.

As a specific embodiment of the present application, the positioning data digital calibration server 102 mainly provides functions such as positioning data DCC certificate (Digital Calibration Certificate) generation, DCC certificate download, and DCC certificate verification. Among them, the generation of the positioning data DCC certificate 204 is to, based on the data submitted by login users (clients) (including the original positioning data collected by the GNSS positioning module 201, the precise positioning data solved by combining differential benchmark data and the differential benchmark data provided by the differential benchmark data service module 101), obtain the calibration result data such as stability, accuracy and uncertainty of related positioning data after comprehensive calibration and comparison calculation, generate the positioning data DCC certificate 204 according to a format of digital calibration certificate and store the positioning data DCC certificate 204 in the database.

As a specific embodiment of the present application, the positioning data digital calibration server 102 provides an external RESTFUL interface service through HTTPS (Secure Hypertext Transfer Protocol). The certificate issued by the CA organization is used for authentication. Only users (clients) holding legal certificates can access/call the interface.

As shown in FIG. 1, a trusted space positioning calibration service system also includes: a trusted space positioning calibration data service interface 402, configured to communicatively connect the trusted space positioning calibration apparatus with the external data application APP 301. The trusted space positioning calibration apparatus provides a data service to the external data application APP 301.

As shown in FIG. 1, the trusted space positioning calibration apparatus includes a GNSS positioning module 201, configured to collect the original positioning information of the trusted space positioning calibration apparatus; a positioning data calculation service module 202, configured to perform differential positioning solution by combining the original positioning information with the differential benchmark data to obtain the positioning data after the differential positioning solution; a positioning data digital calibration client 203, configured to perform timing calibration on the positioning data after the differential positioning solution; and a trusted space positioning calibration data service module 206, configured to achieve data interaction with an external apparatus of the trusted space positioning calibration apparatus.

As a specific embodiment of the present application, the GNSS positioning module 201 is installed in the trusted space positioning calibration apparatus to collect the original positioning information of the trusted space positioning calibration apparatus. The original positioning information includes positioning time, longitude, latitude, altitude, etc. The positioning system compatible with the GNSS positioning module 201 includes Beidou, GPS, GLONASS, and GALILEO.

As a specific embodiment of the present application, the positioning data calculation service module 202 is deployed in the trusted space positioning calibration apparatus, performing solution using related algorithms based on RTK technology in combination with the original positioning data collected by the GNSS positioning module 201 and the differential benchmark data (benchmark reference data) obtained from the differential benchmark data service module 101. The positioning data calculation service module 202 can introduce a calibration correction parameter in the positioning data DCC certificate 204 according to system settings to correct the positioning data, thereby obtaining precise positioning data with an accuracy of up to centimeter level. The positioning data calculation service module 202 can also publish and manage the calculated precise positioning data.

As a specific embodiment of the present application, the positioning data calculation service module 202 has two working modes.

A first type is a to-be-calibration mode, where a calibration correction parameter of DCC is not introduced into an operational parameter of the data solution service. The positioning data of the output data is only for the positioning data digital calibration client 203 to perform calibration operation and generate the corresponding positioning data DCC certificate 204 (which includes the calibration result and the calibration correction parameter).

A second type is a precise positioning mode, which participates in the calculation of positioning data based on the calibration correction parameter of the latest positioning data DCC certificate 204, thereby obtaining precise positioning data with an accuracy of up to centimeter level.

As a specific embodiment of the present application, the positioning data digital calibration client 203 is deployed in the trusted space positioning calibration apparatus, interacts with the positioning data digital calibration server 102, and realizes a timing calibration function of the positioning data deployed in the trusted space positioning calibration apparatus and a download of the calibrated positioning data DCC file.

As a specific embodiment of the present application, the positioning data digital calibration client 203 is further configured to send the original positioning data collected by the GNSS positioning module 201 and the precise positioning data after differential solution to the positioning data digital calibration server 102; obtain the positioning data DCC certificate 204, and perform local storage and data management of the positioning data DCC certificate 204; when the positioning data digital calibration client 203 interacts with the positioning data digital calibration server 102, take a bound device certificate (CA) 205 as the identity authentication and authorization access certificate (based on CA digital signature technology) when accessing the server interface.

As shown in FIG. 1, the trusted space positioning calibration apparatus further includes: the device certificate (CA) 205 and the positioning data DCC certificate 204. The device certificate is used to identify and verify the trusted space positioning calibration apparatus; the positioning data DCC certificate 204 is generated by the positioning data digital calibration server 102 encapsulating business data and the calibration result data of the positioning data calibration of the trusted space positioning calibration apparatus.

As a specific embodiment of the present application, the device certificate (CA) 205 is a device certificate issued to the device by an authoritative CA organization. It is deployed in the trusted space positioning calibration apparatus and is used to identify and verify the trusted space positioning calibration apparatus. As an implementation carrier for its digital identity verification during data calibration and when trusted positioning data is released, the information in the apparatus certificate is bound to a hardware ID (apparatus number) of the trusted space positioning calibration apparatus and the device number of the installed GNSS positioning module 201. The verification and traceability of data identity can be achieved through digital signature and verification of the device certificate. By using a key of the device certificate to provide encryption and decryption functions for the positioning data and the calibration data, the security and reliability requirements of the system data can be achieved.

As a specific embodiment of the present application, the positioning data DCC certificate 204 is generated by the positioning data digital calibration server 102 encapsulating business data and the calibration result data of the positioning data calibration of the trusted space positioning calibration apparatus in a DCC format and a data standard. The positioning data DCC certificate 204 is generated by the positioning data digital calibration server after each calibration is completed. When it is used for precise positioning data generation, it participates in the differential positioning solution process of the original positioning data in combination with the differential benchmark data, providing the calibration correction parameter (which can be understood as a positioning calibration deviation value existed in the apparatus) for the positioning data, thereby obtaining more accurate positioning data. The DCC certificate plays an important role in the metrological quality management system. Based on an internationally recognized and approved exchange format XML (Extensible Markup Language), the DCC certificate can not only serve as a metrological traceability certificate, but also be machine readable. Meanwhile, the CC certificate uses an encrypted signature as a security program to ensure the integrity and authenticity of the location data DCC certificate 204 as a calibration certificate.

As a specific embodiment of the present application, there is a calibration process within the trusted space positioning calibration apparatus. After each calibration, the positioning data DCC certificate 204 is generated, which is the calibration result DCC certificate. Then, the positioning data digital calibration client 203 downloads and saves it in the apparatus. When the trusted space positioning calibration apparatus generates the precise positioning data, it will use the original GNSS positioning module data and the metering-grade GNSS differential.

The benchmark data and the calibration correction parameter in the DCC certificate of the calibration result generated during the latest calibration are solved together to generate the more accurate positioning data.

As a specific embodiment of the present application, the trusted space positioning calibration data service module 206 is deployed in the trusted space positioning calibration apparatus and can provide data services such as relevant positioning data display and query, status reporting, DCC calibration certificate query, DCC based data accuracy verification, CA based data anti-counterfeiting verification, and data encryption communication for various data applications APPs 301.

As a specific embodiment of the present application, the data application APP 301 is a third-party data application that interacts with the trusted space positioning calibration data service module 206 to achieve data applications such as GIS/visual display, status data query, DCC information query reading and verification of data for the data in the trusted space positioning calibration apparatus.

As shown in FIG. 1, data interactive transmission is performed between the differential benchmark data service module 101 and the trusted space positioning calibration apparatus, and between the positioning data digital calibration server 102 and the trusted space positioning calibration apparatus through the Internet 401. The data encapsulation methods are j son and xml. The data transmission protocols are http, https and ntrip. The interactive service interface mode is restful. The access mode is wired Ethernet, WIFI, 4G/5G, etc.

The data application APP 301 is connected with the trusted space positioning calibration apparatus through the trusted space positioning calibration data service interface 402. The trusted space positioning calibration data service interface 402 provides multiple interface encapsulation modes for the trusted space positioning calibration data service, for example, interactive data is encapsulated based on j son and xml formats based on restful interface. Communication interfaces based on inter-process are pipeline (pipeline) and message queue (message queue), the interactive data is based on data flow and data packet.

The trusted space positioning calibration service system provided by the present application integrates technical means such as device certificate (i.e. digital identity and data security CA certificate), metering-grade GNSS differential benchmark data, RTK-based precise positioning data differential solution, and positioning data DCC certificate 204 (DCC digital calibration certificate) to realize the credibility, verifiability, and measurable traceability of the spatial positioning data of the trusted space positioning and calibration apparatus, and can also provide data services such as relevant positioning data display and query, status reporting, DCC digital calibration certificate query, data accuracy verification based on DCC digital calibration certificate, data anti-counterfeiting verification based on certificate (CA) and data encryption communication for various data applications APPs that communicatively connected to the trusted space positioning calibration apparatus.

Embodiment 2

As shown in FIG. 2, the present application provides an operation method of a trusted space positioning calibration service system. The method includes the following steps.

Step S1: generate positioning data to be calibrated.

Specifically, the positioning data to be calibrated is precise positioning data. The precise positioning data is generated by the positioning data calculation service module by performing differential positioning solution through a RTK algorithm based on original positioning data provided by a GNSS positioning module in combination with metering-grade GNSS differential benchmark data, making a calibration correction parameter of the latest positioning data DCC certificate to participate in correction of a calculation parameter (data geometry, stability, and specific channel GNSS reference) in the differential positioning solution to obtain precise positioning data with an accuracy of up to centimeter level and sub-meter level as positioning data to be calibrated.

The present application performs calibration correction on the calculation parameter to obtain higher-precision positioning data by making the calibration correction parameter (calibration parameter) in the calibration certificate (positioning data DCC certificate) to participate in the positioning data calculation process based on the RTK algorithm.

Step S2: calibrate the positioning data to be calibrated.

Specifically, the calibration method of the positioning data to be calibrated is executed by a positioning data digital calibration client summarizing and uploading data related to the differential positioning solution and the original positioning data provided by the GNSS positioning module to a positioning data digital calibration server, a calibration calculation module in the positioning data digital calibration server performing calibration and comparison based on metering-grade GNSS differential benchmark data and the summary data uploaded by the positioning data digital calibration client, calculating and generating a calibration result data DCC file (i.e. the positioning data DCC certificate), and returning the calibration result data DCC file to the positioning data digital calibration client for storing in the trusted space positioning calibration apparatus. The calibration correction parameter in the positioning data DCC certificate is used to generate a correction parameter that provide a solution parameter (positioning data geometry, stability and specific channel GNSS reference) for subsequent generation of positioning data to be calibrated (precise positioning data).

As shown in FIG. 3, using a calibration positioning result DCC file to generate more accurate positioning data includes the following steps.

Step S101, a GNSS positioning module collects original positioning data.

Specifically, the GNSS positioning module collects the original positioning data of the trusted space positioning and calibration apparatus. The original positioning data includes: positioning time, longitude, latitude, altitude, etc. The positioning system compatible with the GNSS positioning module includes Beidou, GPS, GLONASS, and GALILEO.

The positioning data such as positioning time, longitude, latitude and altitude is output. The format of the output data supports NEMA, RTCM and u-blox formats Step S102, obtain differential benchmark data.

Specifically, the trusted space positioning calibration apparatus obtains metering-grade GNSS differential benchmark data provided by a differential benchmark data service module. The metering-grade GNSS differential benchmark data is reference data provided by the differential benchmark data service module, that is, centimeter-level and sub-meter-level differential benchmark data provided using RTK (carrier phase difference) technology. The differential benchmark data service module uses a NTRIP protocol to achieve data interaction with the trusted space positioning calibration apparatus.

The differential benchmark data service module performs data transmission of RTK benchmark reference data in a client server mode.

Step S103, obtain the calibration positioning result DCC file.

Specifically, the business data and the calibration result data of the original positioning data calibration of the trusted space positioning calibration apparatus are encapsulated in the DCC format and data standard to obtain the positioning data DCC certificate (i.e., the calibration positioning result DCC file).

The positioning data DCC certificate (i.e., the calibration and positioning result DCC file) is generated by encapsulating the business data and the calibration result data of the positioning data calibration of the trusted space positioning calibration apparatus; and is stored in the trusted space positioning calibration apparatus.

Step S104: combine the data from steps S101 to S103 to perform a precise positioning data solution service.

Based on the RTK algorithm, differential positioning solution is performed based on the original positioning data in combination with the differential benchmark data to obtain positioning data after the differential positioning solution as the positioning data to be calibrated. According to the positioning data DCC certificate, the positioning data to be calibrated is corrected to obtain the precise positioning data.

The positioning data to be calibrated is calibrated according to the original positioning data, the differential benchmark data and the positioning data to be calibrated to obtain calibration result data. The method of calibrating the positioning data to be calibrated includes: correcting the positioning data to be calibrated according to the calibration correction parameter in the DCC certificate of the positioning data introduced by the system; the calibration correction parameter includes: positioning data geometry, stability and channel GNSS reference quantity.

Step S105, output precise positioning data.

Specifically, precise positioning data is output, and the precise positioning data is used as a data source for data release and data application.

The operation method of the trusted space positioning calibration service system provided by the present application further includes: generating a device certificate and storing the device certificate in the trusted space positioning calibration apparatus.

A data service is provided for an external data application through multiple interface service modes. A method for providing the data service to the external data application through the multiple interface service modes includes: outputting the positioning data to be calibrated and the calibration result data of the trusted space positioning calibration apparatus to the external data application.

Figure 4:
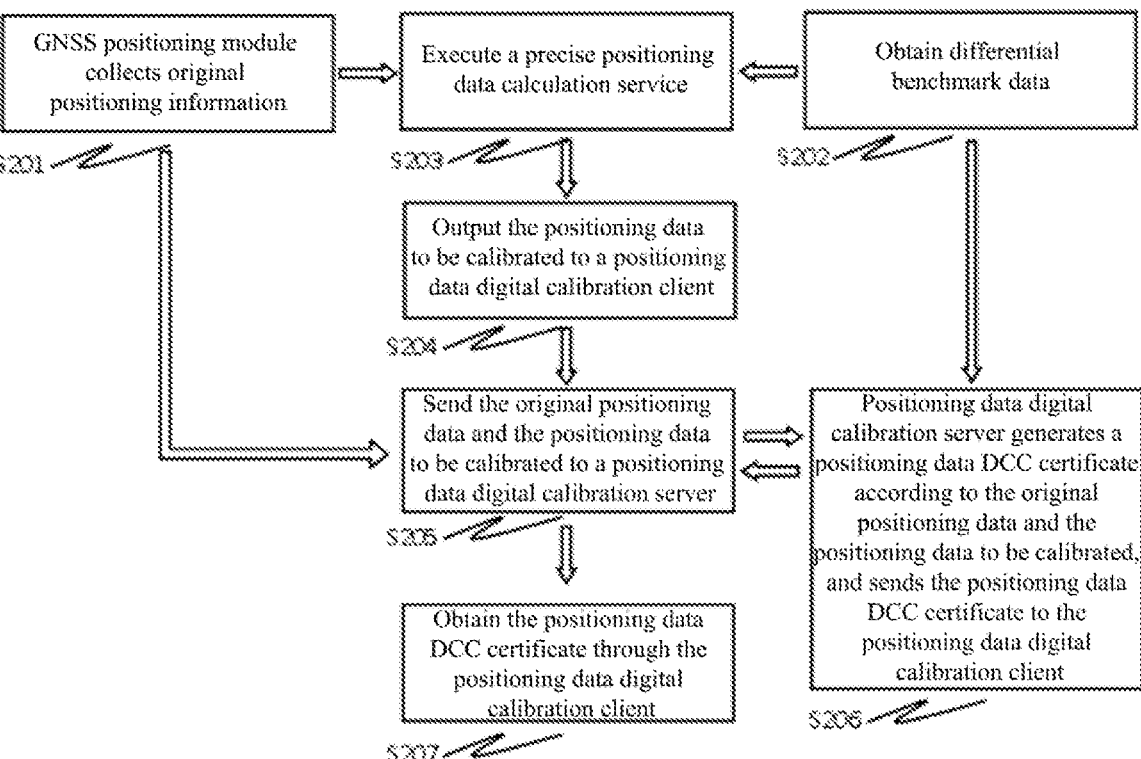
FIG. 4 is a flow chart of a method for generating a positioning data DCC certificate in an operating method of a trusted space positioning calibration service system according to an embodiment of the present application.

As shown in FIG. 4, the method for calibrating the positioning data to be calibrated include the following steps.

Step S201, a GNSS positioning module collects original positioning information.

Specifically, the GNSS positioning module collects the original positioning information of the trusted space positioning calibration apparatus, and transmits the original positioning information to a positioning data calculation service module and a positioning data digital calibration client. The positioning data calculation service module and the positioning data digital calibration client obtain the original positioning information of the trusted space positioning calibration apparatus.

Step S202, obtain differential benchmark data.

Specifically, the differential benchmark data is metering-grade GNSS differential benchmark data (benchmark reference data). The metering-grade GNSS differential benchmark data is reference data provided by the differential benchmark data service module, that is, centimeter-level and sub-meter-level differential benchmark data provided using RTK (carrier phase difference) technology. The differential reference data service module uses a NTRIP protocol for data interaction. The differential benchmark data service module transmits the metering-grade GNSS differential benchmark data to the positioning data calculation service module and the positioning data digital calibration server. The positioning data calculation service module and the positioning data digital calibration server receive the metering-grade GNSS differential benchmark data.

Step S202 works in a NtripServer mode, and step S203 works in a NtripClient mode. Data transmission of RTK benchmark reference data is performed in a client server mode.

Step S203, execute a precise positioning data solution service.

Based on the RTK algorithm, the original positioning data and the differential benchmark data are combined to perform solution to obtain positioning data as the positioning data to be calibrated.

Step S204: output the positioning data to be calibrated to a positioning data digital calibration client.

Step S205: send the original positioning data and the positioning data to be calibrated to a positioning data digital calibration server.

Specifically, the positioning data digital calibration client sends the original positioning data and the positioning data to be calibrated received to the positioning data digital calibration server.

Step S206: the positioning data digital calibration server generates a positioning data DCC certificate according to the original positioning data and the positioning data to be calibrated, and sends the positioning data DCC certificate to the positioning data digital calibration client.

Specifically, the positioning data digital calibration server mainly provides functions such as positioning data DCC certificate (Digital Calibration Certificate) generation, DCC certificate download, DCC certificate verification. Generation of DCC certificate: the original positioning data collected by the GNSS positioning module, the positioning data to be calibrated, and the differential benchmark data submitted by the client are comprehensively calibrated and compared to calculate calibration result data such as stability, accuracy, uncertainty of the relevant positioning data, and the DCC certificate is generated according to the format standard of the digital calibration certificate and stored in a database.

Specifically, the business data and the calibration result data of the positioning data calibration of the trusted space positioning calibration apparatus are encapsulated in the DCC format and data standard. This certificate file is generated by the positioning data digital calibration server and provides correction parameters of positioning data geometry (geometric quantity is a quantity that reflects physical reality), stability and specific channel GNSS reference quantity for subsequent generation of precise positioning data.

Step S207, obtain the positioning data DCC certificate through the positioning data digital calibration client.

As shown in FIG. 4, a data application APP outside of the trusted space positioning calibration (apparatus) service system covers multiple types such as client programs, web browsers, and mobile APPs. The external data application APP can realize data applications such as display and query of positioning data (apparatus) calibration GIS map; generation of a positioning data quick response code and (traceability, verification) application of the quick response code; query, download and verification of positioning data digital calibration certificate (DCC); an operating real-time system status query of a trusted space positioning calibration (apparatus).

Figure 5:
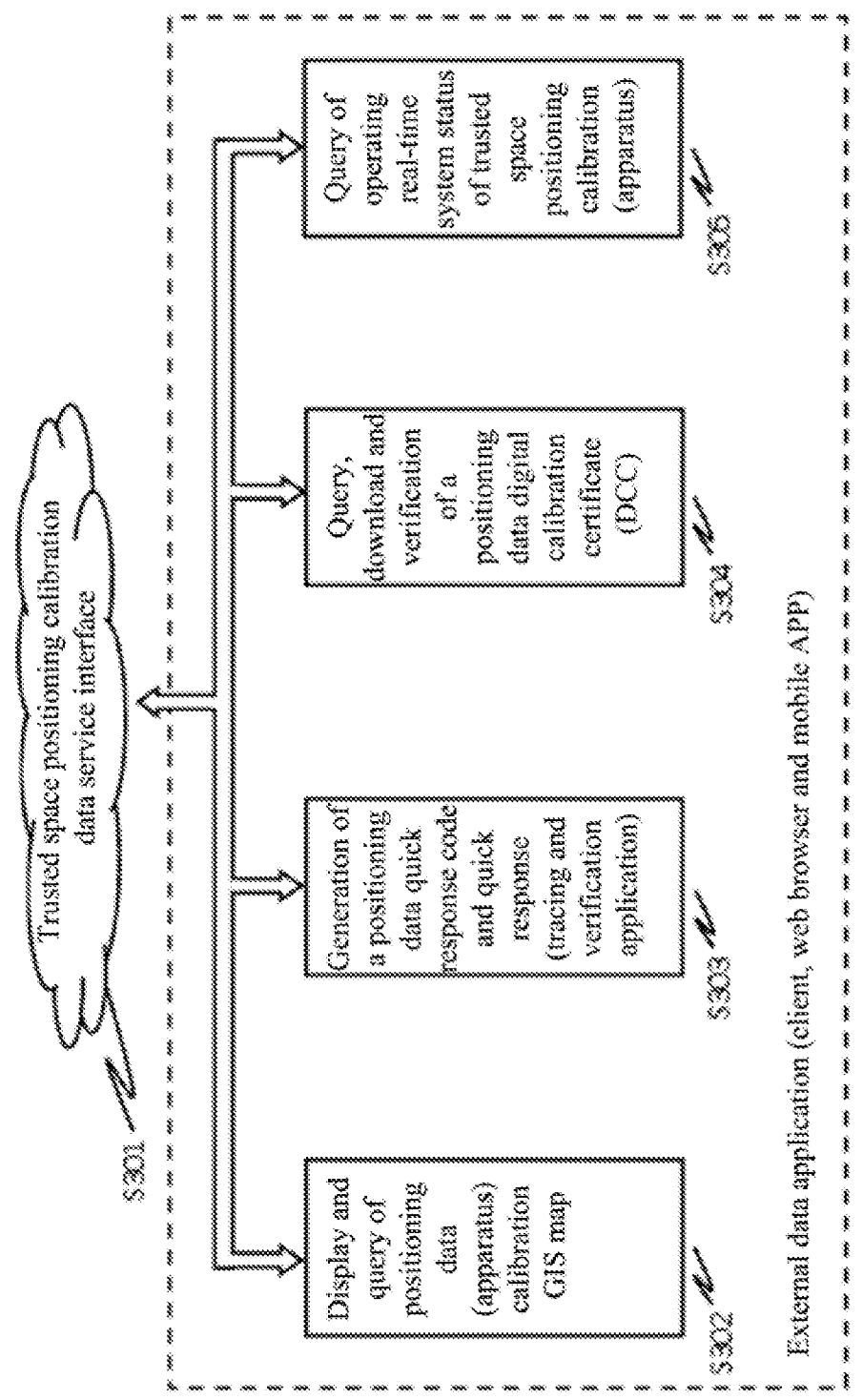
FIG. 5 is a flow chart of a method for obtaining data by a data application APP according to an embodiment of the present application.

As shown in FIG. 5, the specific application steps of the data application APP are as follows.

Step S301: provide multiple interface encapsulation modes for a trusted space positioning calibration data service module.

Specifically, multiple interface encapsulation modes are provided for the trusted space positioning calibration data service, and a data service is provided for an external data application in an interface service mode. Among them, based on restful interface, interactive data is encapsulated based on json and xml formats. Communication interfaces based on inter-process are pipeline (pipeline) and message queue (message queue), the interactive data is based on data flow and data packet.

Specifically, through multiple interface encapsulation modes, the trusted space positioning calibration data service module can output trusted space positioning calibration (apparatus) precise positioning data to the external data application APP; output quick response code (precise positioning data, device ID) or verification data of quick response code data; output trusted space positioning calibration (apparatus) calibration result data (DCC) and DCC file verification data; and output system operating status data of the trusted space positioning calibration (apparatus).

Step S302, obtain positioning data calibration GIS map through a trusted space positioning calibration data service interface.

Specifically, the external data application APP can realize display and query of the positioning data (apparatus) calibration GIS map through the trusted space positioning calibration data service interface. Users can query the positioning calibration of the apparatus in the GIS map and browse related attribute data.

The external data application APP outputs data service interface request data to the trusted space positioning calibration data service interface.

Step S303, obtain a positioning data quick response code through the trusted space positioning calibration data service interface.

Specifically, the external data application APP realizes generation of a positioning data quick response code and (tracing and verification) application of the quick response code through the trusted space positioning calibration data service interface. The system can generate a quick response code according to the positioning data, basic apparatus information and apparatus calibration information in the trusted space positioning calibration apparatus, and supports the verification of the quick response code and data contained in the quick response code to support the traceability and verification of trusted positioning data.

The external data application APP outputs data service interface request data to the trusted space positioning calibration data service interface.

Step S304, obtain a positioning data DCC certificate through the trusted space positioning calibration data service interface.

Specifically, the external data application APP implements query, download and verification of the positioning data digital calibration certificate (DCC) through the trusted space positioning calibration data service interface. Users can query an apparatus calibration log list, download a corresponding DCC certificate file, browse structural data of the DCC certificate, and verify the validity of the DCC certificate.

The external data application APP outputs data service interface request data to the trusted space positioning calibration data service interface.

Step S305: obtain an operating real-time system status of the trusted space positioning calibration apparatus through the trusted space positioning calibration data service interface.

Specifically, the external data application APP realizes data applications such as operating real-time system status query of the trusted space positioning calibration apparatus through the trusted space positioning calibration data service interface. Users can query system-like data such as the number, channels and status of real-time on-orbit GNSS satellites received when the apparatus is positioned, basic information about the metering-grade GNSS differential benchmark station connected to the apparatus, the apparatus's latest calibration time, summary data of a calibration result DCC, and stability and uncertainty information of the positioning data.

The external data application APP outputs data service interface request data to the trusted space positioning calibration data service interface.

The beneficial effects achieved by the present application are as follows.

(1) The present application performs calibration corrections on the calculation parameter to obtain higher-precision positioning data by making the calibration correction parameter in the positioning data DCC certificate to participate in the positioning data calculation process based on the RTK algorithm.

(2) The positioning data digital calibration calculation module of the present application performs calibration and comparison based on metering-grade GNSS differential benchmark data and summary data uploaded by the positioning data digital calibration client, calculates and generates a calibration result data DCC file, and returns the calibration result data DCC file to the positioning data digital calibration client for storing in the trusted space positioning calibration apparatus to provide the correction parameter for subsequent generation of positioning data, thereby obtaining higher-precision positioning data.

(3) The device certificate (CA) of the present application is bound to a hardware ID of the trusted space positioning calibration apparatus and serves as an implementation carrier for its digital identity verification during data calibration and when trusted positioning data is released. Through the digital signature and verification of the device certificate, data identity verification and traceability are achieved. By using a key of the device certificate to provide encryption and decryption functions for the positioning data and calibration data, the security and reliability requirements of system data are achieved.

The above are only embodiments of the present application and are not intended to limit the present application. Various modifications and variations will occur to the present application to those skilled in the art. Any modifications, equivalent substitutions, improvements, etc. made within the spirit and principles of the present application shall be included in the scope of the claims of the present application.

What is claimed is:

1. A trusted space positioning calibration service system, comprising: a differential benchmark data service module, a positioning data digital calibration server and a trusted space positioning calibration apparatus;

the differential benchmark data service module is communicatively connected to the trusted space positioning calibration apparatus, and is configured to provide differential benchmark data to the trusted space positioning calibration apparatus;

the trusted space positioning calibration apparatus is configured to collect original positioning data of the trusted space positioning calibration apparatus, perform differential positioning solution in combination with the differential benchmark data, and obtain positioning data after the differential positioning solution as positioning data to be calibrated;

the positioning data digital calibration server is communicatively connected to the trusted space positioning calibration apparatus, and is configured to receive original positioning data, the differential benchmark data and the positioning data to be calibrated from the trusted space positioning calibration apparatus and calibrate the positioning data to be calibrated according to the original positioning data, the differential benchmark data and the positioning data to be calibrated to obtain calibration result data.

2. The trusted space positioning calibration service system according to claim 1, wherein the trusted space positioning calibration apparatus comprises a positioning data DCC certificate, the positioning data digital calibration certificate (DCC) certificate is generated by the positioning data digital calibration server after each calibration is completed, and is used to participate in a differential positioning solution process of the original positioning data combined with the differential benchmark data when generating precise positioning data and provide a calibration correction parameter for the positioning data to obtain more accurate positioning data.

3. The trusted space positioning calibration service system according to claim 1, wherein the trusted space positioning calibration apparatus comprises:

a GNSS positioning module, configured to collect the original positioning information of the trusted space positioning calibration apparatus;

a positioning data calculation service module, configured to perform differential positioning solution by combining the original positioning information with the differential benchmark data to obtain the positioning data after the differential positioning solution;

a positioning data digital calibration client, configured to perform timing calibration on the positioning data after the differential positioning solution; and a trusted space positioning calibration data service module, configured to achieve data interaction with an external apparatus of the trusted space positioning calibration apparatus.

4. The trusted space positioning calibration service system according to claim 1, further comprising: a trusted space positioning calibration data service interface, configured to communicatively connect the trusted space positioning calibration apparatus with an external data application APP.

5. An operation method of the trusted space positioning calibration service system according to claim 1, wherein the method comprises the following steps:

generating the positioning data to be calibrated; and calibrating the positioning data to be calibrated.

6. The operating method of the trusted space positioning calibration service system according to claim 5, wherein the generating positioning data to be calibrated comprises:

collecting the original positioning data of the trusted space positioning calibration apparatus;

obtaining the differential benchmark data; and performing the differential positioning solution in combination with the differential benchmark data according to the original positioning data, and obtaining the positioning data after the differential positioning solution as the positioning data to be calibrated.

7. The operating method of the trusted space positioning calibration service system according to claim 5, wherein the calibrating the positioning data to be calibrated comprises:

calibrating the positioning data to be calibrated according to the original positioning data, differential benchmark data and the positioning data to be calibrated to obtain calibration result data; and generating positioning data DCC certificate comprising calibration correction parameter after each calibration is completed, wherein the positioning data DCC certificate is used to participate in a differential positioning solution process of the original positioning data combined with the differential benchmark data when generating precise positioning data and provide a calibration correction parameter for the positioning data to obtain more accurate positioning data.

8. The operating method of the trusted space positioning calibration service system according to claim 5, wherein the calibrating the positioning data to be calibrated further comprises:

encapsulating business data and the calibration result data of the positioning data calibration of the trusted space positioning calibration apparatus to generate positioning data DCC certificate; and storing the positioning data DCC certificate in the trusted space positioning calibration apparatus.

9. The operating method of the trusted space positioning calibration service system according to claim 5, further comprising:

generating a device certificate and storing the device certificate in the trusted space positioning calibration apparatus.

10. The operating method of the trusted space positioning calibration service system according to claim 5, further comprising:

providing a data service for an external data application through multiple interface service modes.

* * * * *